(No Model.)
J. PARKER.
BEVEL GEARED BICYCLE.
No. 561,516.　　　　　　　　　　Patented June 2, 1896.
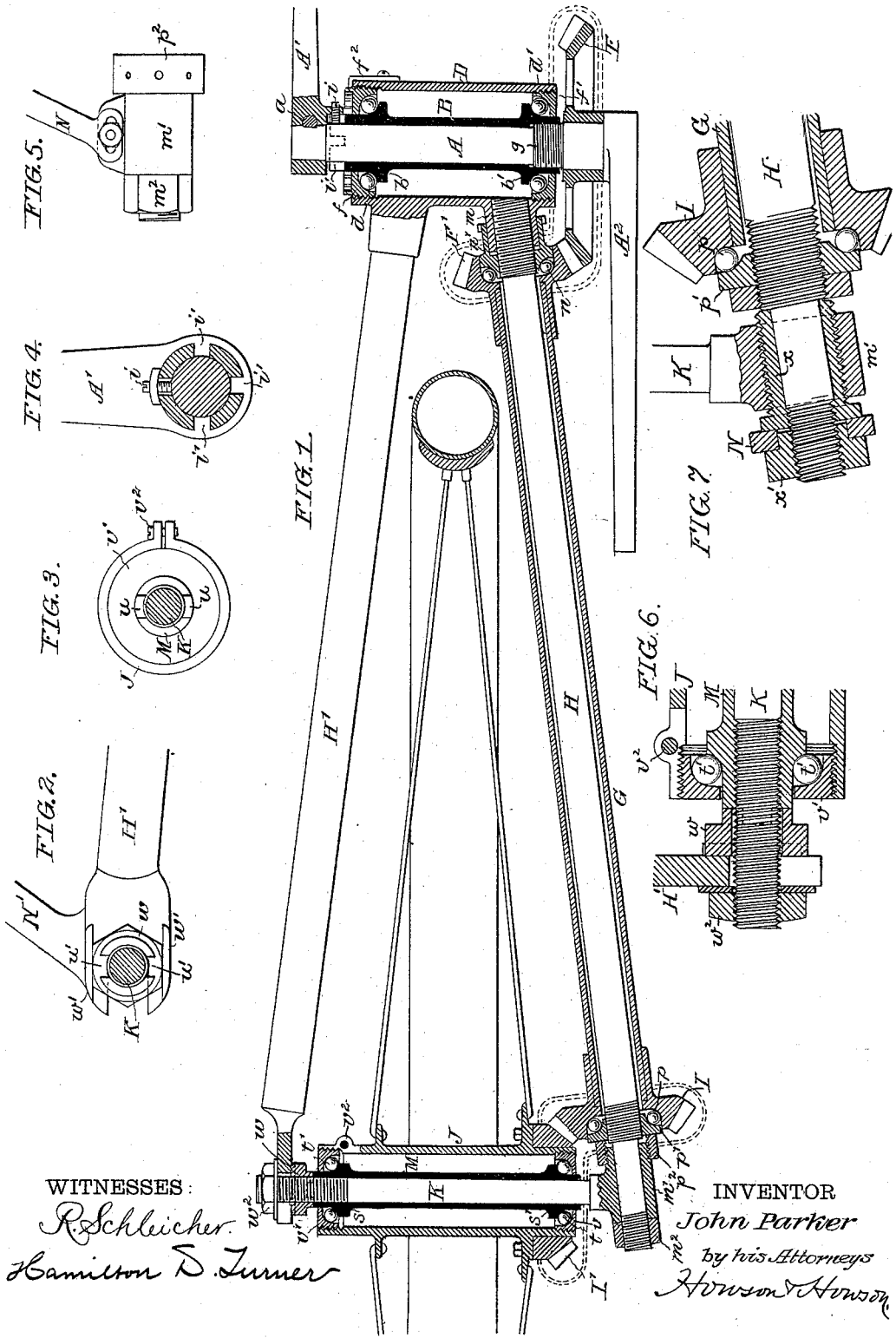
WITNESSES:
R. Schleicher.
Hamilton D. Turner.
INVENTOR
John Parker
by his Attorneys
Howson & Howson

UNITED STATES PATENT OFFICE.

JOHN PARKER, OF PHILADELPHIA, PENNSYLVANIA, ASSIGNOR OF ONE-HALF TO PASCHALL H. MORRIS, OF SAME PLACE.

BEVEL-GEARED BICYCLE.

SPECIFICATION forming part of Letters Patent No. 561,516, dated June 2, 1896.

Application filed May 13, 1895. Serial No. 549,036. (No model.)

*To all whom it may concern:*

Be it known that I, JOHN PARKER, a subject of the Queen of Great Britain and Ireland, and a resident of Philadelphia, Pennsylvania, have invented Improvements in Bevel-Geared Bicycles, of which the following is a specification.

My invention relates to that class of bicycles in which bevel-gears are employed in place of the usual chain and sprocket gearing for transmitting the movement of the crank-shaft to the hub of the driving-wheel, one object of my invention being to so construct the frame and bearings of the bicycle that the accurate adjustment of the bevel-wheels necessary for perfect meshing of the same can always be effected, and a further object being to provide an extremely stiff and rigid connection between the lower fork of the frame and the rear axle, so as to prevent disarrangement of the gears by the springing of said frame. These objects I attain in the manner hereinafter set forth, reference being had to the accompanying drawings, in which—

Figure 1 is a view mainly in sectional plan and illustrating sufficient of the framework and driving mechanism of a bicycle to illustrate my invention. Figs. 2, 3, 4, 5, and 6 are detached views of parts of the same, and Fig. 7 is a sectional view illustrating a modified construction of part of the frame.

A is the crank-shaft of the machine, having at its opposite ends crank-arms $A'$ $A^2$. The arm $A^2$ may be fixedly secured to the shaft in any appropriate way, the arm $A'$, however, being detachable and being held normally in position by means of a suitable key $a$. Surrounding the shaft A is a transverse sleeve B, which has external collars $b$ $b'$, forming inner raceways for the opposite sets of bearing-balls $d$ $d'$, the outer raceway for the balls $d'$ being formed by a collar $f'$, screwed into one end of the tubular shaft-hanger D, and by preference fixedly secured thereto.

The outer raceway for the opposite set of balls $d$ is formed by a follower $f$, which is screwed into the opposite end of the tubular shaft-hanger D, but is adjustable and detachable, so as to permit of the insertion and removal of the sleeve B and the proper retention of the balls $d$, said follower $f$ being secured in position after adjustment in any suitable manner—as, for instance, by means of a locking-finger $f^2$, adapted to one of a series of notches in a projecting flange of the follower, or by splitting the end of the shaft-hanger and providing the same with a clamping-screw in the manner which I have adopted and will hereinafter describe in connection with the hub of the driving-wheel.

The crank-shaft A has a threaded portion $g$, which is adapted to a threaded opening in one end of the sleeve B, and the opposite end of the crank-shaft is provided with means whereby it can be locked to said sleeve B in any one of several positions of adjustment. In the present instance this locking means comprises a set-screw $i$, carried by a projecting lug on the crank-arm $A'$, and adapted to enter any one of a series of notches $i'$, formed in the projecting end of the sleeve B. (See Fig. 4.)

The sleeve B being immovably held laterally within the tubular shaft-hanger D, it will be apparent that the shaft A can be adjusted laterally in said sleeve by first releasing it from engagement with the sleeve and then turning it in one direction or the other, so as to cause its threaded portion $g$ to be screwed into or unscrewed from the threaded end of the sleeve, the shaft being again locked to the sleeve after adjustment by causing the set-screw $i$ to engage with one of the notches $i'$ of the sleeve.

Rigidly secured to the crank-shaft A is a bevel-wheel F, which may be a single structure, or may consist of a central spider with detachable rim. This bevel-wheel F meshes with a bevel-pinion $F'$, carried by a tubular shaft G, which surrounds the lower fork H of the frame, the rear end of said tubular shaft carrying a bevel-pinion I, which meshes with another bevel-pinion $I'$ on the hub J of the driving-wheel.

The front end of the lower fork H is threaded for adaptation to a threaded boss $m$, projecting rearwardly from the tubular crank-shaft hanger D, and is rigidly secured in said boss by brazing or otherwise, and the rear end of said fork H is reduced in diameter and passes through a block $m'$, formed integral with the rear axle K, as shown in Fig. 1, the outer end of said reduced portion of the fork H being threaded for the reception of a nut $m^2$, which bears against the rear end of said block $m'$.

The shaft G turns on ball-bearings at the front and rear ends, the front set of balls $n$ being confined between an outer raceway formed in the pinion $F'$ and an inner raceway formed on a follower $n'$, which is adjustable on the threaded front portion of the fork H, and the rear set of balls $p$ is adapted to an outer raceway formed in the pinion I and an inner raceway formed in a follower $p'$, also adapted to a threaded portion of the fork H. Bearing against this follower $p'$ is a jam-nut $p^2$, which is adapted to a thread cut upon the forward end of the block $m'$. The adjustment of this nut $p^2$ therefore determines the position of the pinion I in respect to the pinion $I'$ on the hub of the driving-wheel, and by a proper adjustment of said nut $p^2$ accurate engagement of these two pinions can be insured, accidental unscrewing of the nut $p^2$ being prevented, owing to the fact that it is jammed firmly onto the threads of the block $m'$ by tightening up the nut $m^2$ at the end of the fork H.

The bevel-wheel F and pinion $F'$ can be caused to properly engage with each other by a lateral adjustment of the crank-shaft A in the sleeve B and by an adjustment of the follower $m$ on the fork H.

Very delicate adjustment of the bevel-wheel in respect to the pinion is thus provided for. For instance, if the threaded portion $g$ of the crank-shaft A has twenty-five threads to the inch and the end of the sleeve B has four notches a movement of the crank-shaft so as to carry the set-screw $i$ from one notch to the next will effect lateral adjustment of the crank-shaft to the extent of one-hundredth part of an inch, while very minute longitudinal adjustment of the pinion $F'$ is effected by the follower $m$, so that ample provision is made for insuring the accurate mesh of the gears.

Surrounding the rear axle K is a sleeve M, which has external collars $s\ s'$, forming the inner races for two sets of balls $t\ t'$, the outer race for the balls $t$ being formed in a collar $v$, screwed into one end of the hub G of the driving-wheel and by preference immovably held in position therein. The outer race for the opposite set of balls $t'$ is formed in a follower $v'$, which is screwed into the opposite end of the hub J and is adjustable in and detachable from said end of the hub, the latter being split at the end and provided with a clamp-bolt $v^2$, whereby it can be tightened upon the follower $v'$ in order to hold the same in any position of adjustment.

The sleeve M is threaded at one end and screwed on the axle K, and has lugs $u$, engaging with recesses $u'$ in a block $w$, which is loosely mounted on the end of said axle K and is prevented from turning thereon by engagement with the ribs $w'$, formed upon the inner side of the rear end of the lower fork $H'$, which is secured to the shaft-hanger D at its front end and has in it at the rear end a longitudinal slot for the reception of axle K, which is held in position in the slot by the clamping of the rear end of the fork between the block $w$ and an outer nut $w^2$ on the axle. By slackening up or removing the nut $w^2$, so as to permit of the lateral movement of the rear end of the fork $H'$ until the ribs $w'$ no longer confine the block $w$, the latter, and with it the sleeve M, can be turned so as to effect lateral adjustment of said sleeve on the axle and consequent adjustment of the pinion $I'$ of the hub to or from the pinion I, and by removing the nut $m^2$ and disconnecting the block $m'$ from the lower end of the rear fork N the driving-wheel, with its axle and sleeve, can be readily removed from the machine without disturbing the bearings of said wheel, nor does such removal affect the bearings of the tubular driving-shaft G, the latter remaining in their proper position on the lower fork H. If the end of the sleeve M is made of polygonal shape and caused to engage with the ribs $w'$, or if a jam-nut is used on the axle beyond the end of the sleeve, the use of the block $w$ will be unnecessary.

The crank-shaft can be readily removed without disturbing the bearings of the sleeve B in the hanger D by first removing the crank-arm $A'$ and then unscrewing the crank-shaft from the sleeve B, so that all parts of the driving-gear are accessible at any time for inspection or repair.

The rear fork $N'$ may be bolted to the lower fork $H'$ or may be brazed thereto or formed in one piece therewith, as shown in Fig. 2. The lower end of the rear fork N is slotted, as shown in Fig. 5, so as to permit of the necessary adjustment of the block $m'$.

By making the block $m'$ integral with the axle K, providing an extended bearing in said block for the rear end of the lower fork H, and securing said rear end of the fork firmly to the block an extremely rigid construction of this part of the frame of the bicycle is insured, this being a matter of importance, as it is necessary to prevent derangement of the gears, which would follow any deflection or yielding of the frame.

In Fig. 7 I have illustrated a modified form of connection between the fork H and block $m'$. In this case the block is internally threaded for the reception of a tubular nut $x$, which bears at the front end against the shoulder formed by reducing the diameter of the fork H. The lower end of the rear fork N is confined between the rear end of the nut $x$ and a nut $x'$, which has a circular projection entering an opening in said fork, so that when the nut is removed the fork can be readily swung rearward and upward, so as to clear the end of the fork H.

Having thus described my invention, I claim and desire to secure by Letters Patent—

1. The combination in a bevel-geared bicycle, of a crank-shaft hanger, a sleeve mounted so as to be free to turn in bearings therein, and a crank-shaft laterally adjustable in said sleeve and carrying one of the wheels of the gearing, substantially as specified.

2. The combination in a bevel-geared bicycle, of a crank-shaft hanger, a sleeve free to turn in bearings therein, a crank-shaft carrying one of the wheels of the gearing and having a threaded portion adapted to a threaded portion of the sleeve, and means for locking the crank-shaft to said sleeve, substantially as specified.

3. The combination in a bevel-geared bicycle, of the crank-shaft hanger, a sleeve free to turn in bearings therein and having a notched end, the crank-shaft carrying one of the wheels of the gearing and having a threaded portion adapted to a threaded portion of the sleeve, and a set-screw carried by one of the crank-arms and adapted to engage with any one of the series of notches in the projecting end of the sleeve, substantially as specified.

4. The combination of the crank-shaft having a bevel-wheel, the crank-shaft hanger, the driving-wheel having a hub with bevel-pinion thereon, the tubular shaft having pinions, one engaging with the bevel-wheel on the crank-shaft, and the other with the pinion on the hub of the driving-wheel, ball-bearings for the front and rear ends of said tubular driving-shaft, a fixed axle for the driving-wheel, a lower fork of the frame passing through the tubular driving-shaft and through a block on the axle of the rear wheel, and a nut having a bearing on said block and serving to limit the approach of the latter toward the rear ball-race of the tubular shaft without affecting the position of the follower of said rear ball-race, substantially as specified.

5. The combination of the crank-shaft having a bevel-wheel, the driving-wheel having a hub with bevel-pinion, a shaft surrounding one of the lower forks of the machine and having at one end a pinion engaging with the bevel-wheel on the crank-shaft and at the other end a pinion engaging with that on the hub of the driving-wheel, ball-bearings for the front and rear ends of said shaft, a rear axle having a block to which the rear end of the fork is secured, and a nut carried by said block and independent of the follower of the rear ball-race of the tubular driving-shaft whereby adjustment of said block in respect to the rear pinion of said tubular driving-shaft can be effected, substantially as specified.

6. The combination of the crank-shaft having a bevel-wheel, the driving-wheel having a hub with bevel-pinion, a shaft surrounding one of the lower forks of the machine, and having at one end a pinion engaging with the bevel-wheel on the crank-shaft and at the other end a pinion engaging with that on the hub of the driving-wheel, ball-bearings for the front and rear ends of said shaft, a rear axle having a block to which the rear end of the fork is secured, and a nut adjustable on said block and bearing against the follower of the rear bearing of the tubular driving-shaft, substantially as specified.

7. The combination of the driving-wheel, the rear axle, a sleeve surrounding the same, and provided with means for effecting lateral adjustment, bearings on said sleeve for the hub of the driving-wheel, and means whereby the sleeve is locked to a fixed part of the bicycle structure so as to prevent it from turning in the hub of the wheel, substantially as specified.

In testimony whereof I have signed my name to this specification in the presence of two subscribing witnesses.

JOHN PARKER.

Witnesses:
 WILL. A. BARR,
 JOS. H. KLEIN.